US011348419B1

(12) United States Patent
Thomas

(10) Patent No.: US 11,348,419 B1
(45) Date of Patent: May 31, 2022

(54) EMERGENCY RESCUE NOTIFICATION APPARATUS AND SYSTEM FOR STORM SHELTERS

(71) Applicant: Robert F. Thomas, Visalia, CA (US)

(72) Inventor: Robert F. Thomas, Visalia, CA (US)

(*) Notice: Subject to any disclaimer, the term of this patent is extended or adjusted under 35 U.S.C. 154(b) by 4 days.

(21) Appl. No.: 17/115,678

(22) Filed: Dec. 8, 2020

(51) Int. Cl.
*G08B 7/06* (2006.01)
*E04H 12/34* (2006.01)
*E04H 9/14* (2006.01)
*F21V 33/00* (2006.01)
*E04H 12/18* (2006.01)
*E04H 9/00* (2006.01)

(52) U.S. Cl.
CPC .............. *G08B 7/064* (2013.01); *E04H 9/00* (2013.01); *E04H 9/14* (2013.01); *E04H 12/18* (2013.01); *E04H 12/34* (2013.01); *F21V 33/006* (2013.01); *Y02A 50/00* (2018.01)

(58) Field of Classification Search
CPC .......... E04H 1/12; E04H 1/1205; E04H 9/00; E04H 9/028; E04H 9/04; E04H 9/08; E04H 9/14; E04H 12/18; E04H 12/34; E04H 9/12; Y02A 50/00; G08B 7/064; F21V 33/006

USPC ................ 52/169.6, 128, 133, 134
See application file for complete search history.

(56) References Cited

U.S. PATENT DOCUMENTS 10,718,132 B1 * 7/2020 Locke ................... E04H 9/14
2007/0251159 A1 * 11/2007 Wagner ................ E04H 9/145
52/19

* cited by examiner

Primary Examiner — Andrew J Triggs
(74) Attorney, Agent, or Firm — Richard A. Ryan

(57) ABSTRACT

An apparatus and system utilized in a storm shelter to notify rescue personnel that a person is in the storm shelter and needs assistance to get out. The apparatus comprises a tubular member, a cap at the upper end of the tubular member, a mechanism at the upper end of the tubing to signal rescue personnel and a mechanism to move the tubular member upward. The signaling mechanism is a light source with apertures in the tubing to allow light to emanate outward, reflective material, florescent paint and/or an audible source. The moving mechanism comprises a threaded rod vertically supported by a base with a threaded nut that rotates on the rod to raise the tubular member or it comprises a lifting mechanism that raises the tubular member. The system has an opening in the upper wall of the shelter and a removable plug apparatus that plugs the opening.

22 Claims, 6 Drawing Sheets

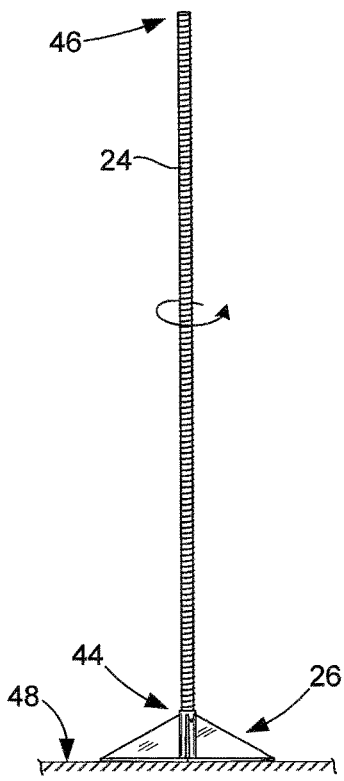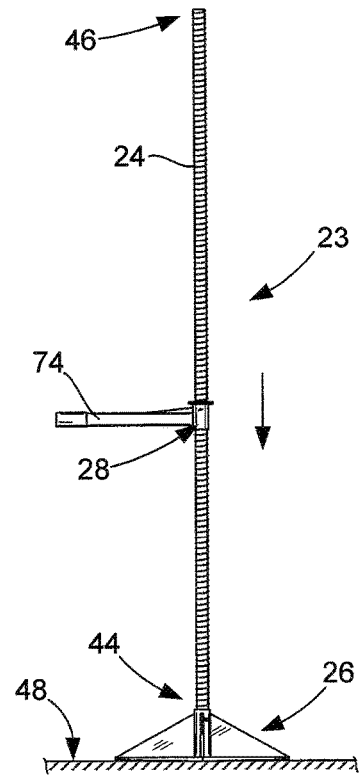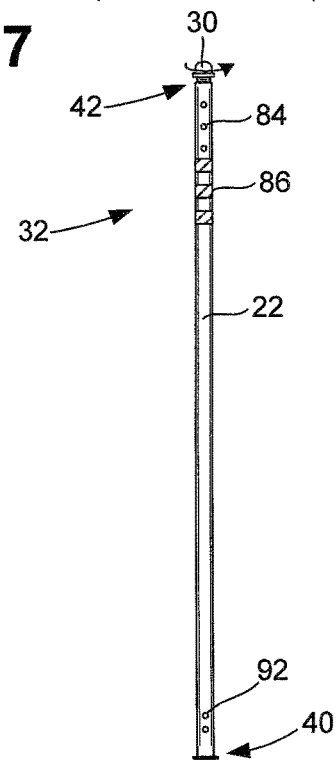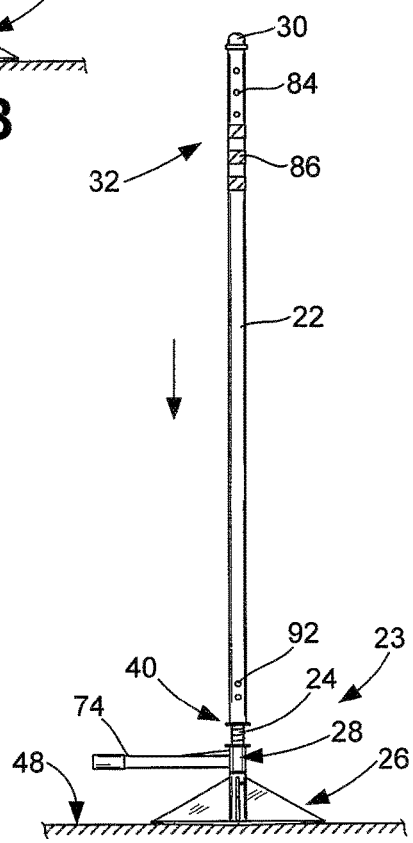
FIG. 7
FIG. 8
FIG. 9
FIG. 10

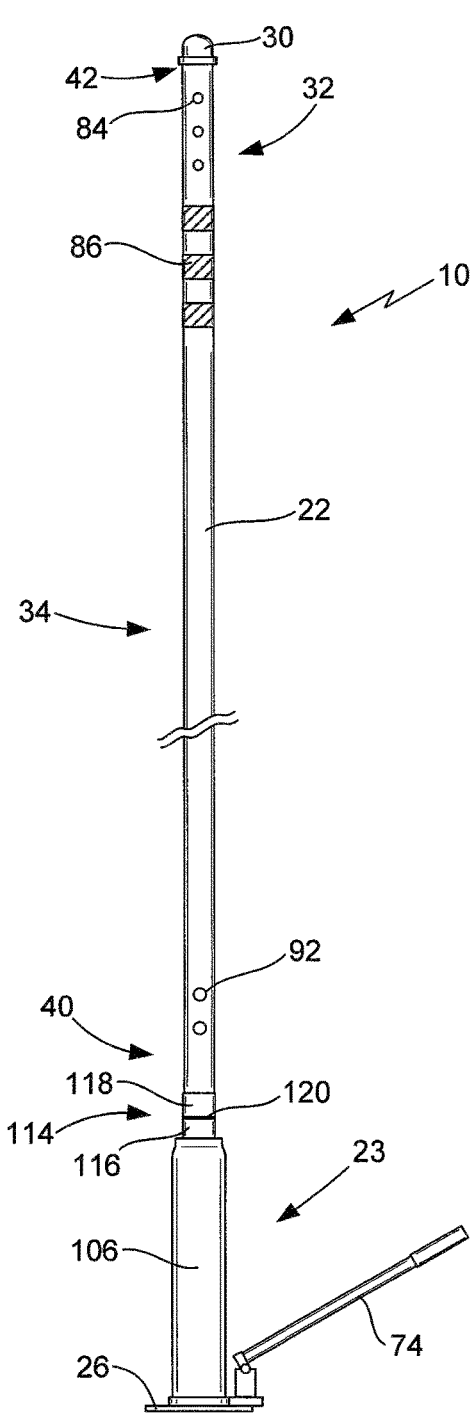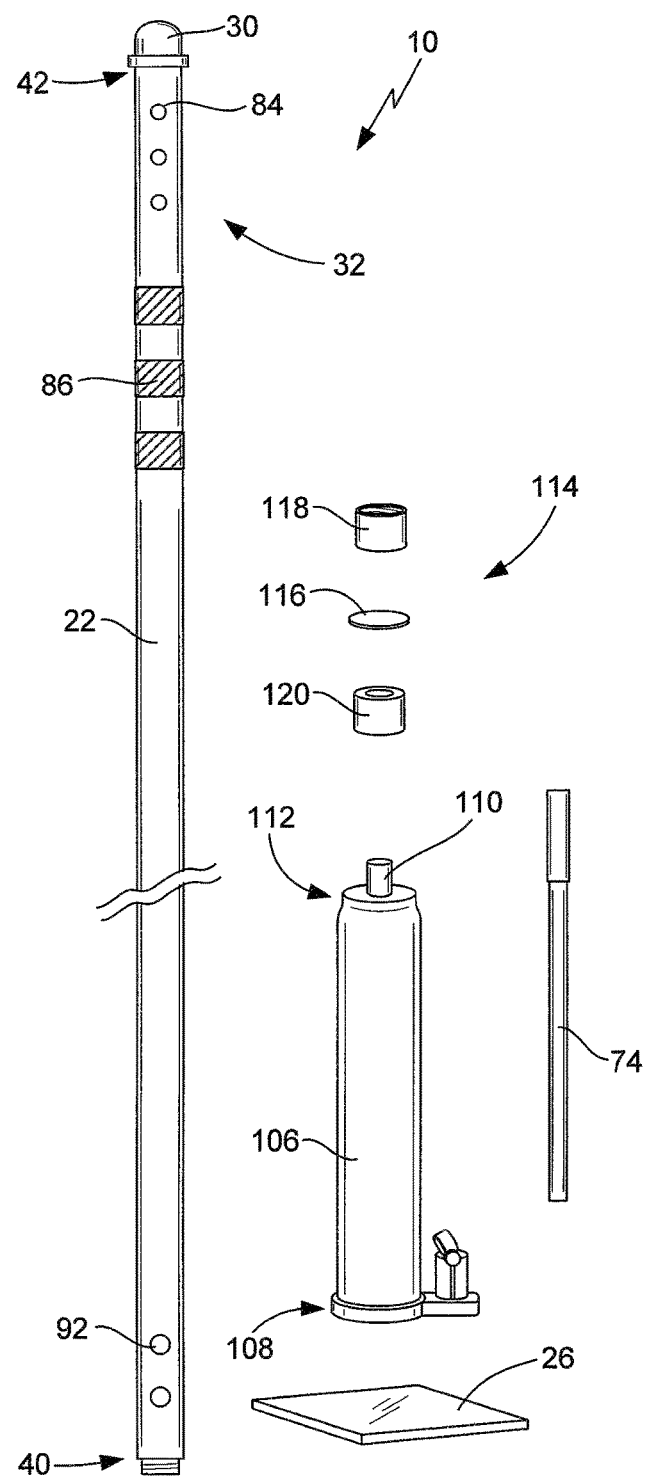
FIG. 11
FIG. 12

EMERGENCY RESCUE NOTIFICATION APPARATUS AND SYSTEM FOR STORM SHELTERS

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses and systems utilized to notify rescue personnel that the user thereof is in need of rescue or like assistance from the rescue personnel. In particular, the present invention relates to such apparatuses and systems that are useful for notifying the rescue personnel that one or more people are located under debris. Even more particularly, this invention relates to such apparatuses and systems that allow a person trapped in an underground shelter covered with debris to signal rescue personnel that he or she is in the shelter and needs to be rescued.

B. Background

In many areas of the United States and throughout the world people live in areas where violent and often very dangerous weather may occur at various times throughout the year. As well known by people who live in these violent and dangerous weather prone areas, the storm systems that create this type of weather can arise quite quickly. One example of such storm systems is the type that has the potential to produce tornados, which are known to be highly dangerous and, in any given year, are responsible for a relatively significant number of injuries and fatalities. While this type of storm system typically develops in a somewhat or at least generally predictable manner, whether the storm system will actually produce a tornado and whether that tornado will touch down in a given area are, given the current state of technology, not able to be forecast with much confidence or accuracy. In fact, most often a tornado warning is not given until the tornado has been visually verified by a person on the ground. As a result, people living in an area where a storm system might produce a tornado generally do not have much advance warning that a tornado is on the ground in their area and, as such, could be a threat to their physical well being or even their lives. Although other storm systems are generally more predictable or slower moving, such as hurricanes, massive dust storms and the like, they can also result in injury and loss of life to people who happen to be in the path of the storm system.

Due to the short notice that is typically available for a tornado or the like, people who live in the path of the storm system generally do not have much time to get out of the area through which the storm system is moving. In fact, with regard to tornados, most emergency service organizations strongly recommend that people do not attempt to flee the area once a tornado is on the ground due to the risk that they may be caught out in the open when the tornado strikes the area in which they are located. Instead of attempting to outrun the tornado, emergency service organizations generally recommend that people in the path of a tornado take shelter where they are located. For some people, the best they can hope for is to take shelter in an interior room, preferably one without any windows, and wait out the tornado. In areas where tornado activity is particularly likely to occur, such as in certain areas of the Midwest (i.e., the "Tornado Alley") and Southeast United States, many people have underground storm shelters in which they can retreat to and wait out the storm when a tornado, or even the likelihood for a tornado, is near the area in which they are located. Some neighborhood organizations, towns, cities, municipalities, businesses and other entities also have underground storm shelters that are sized and configured to provide a safe location for people to wait out a tornado or other dangerous storm system.

The typical private, home-based underground storm shelter is sized and configured to safely hold one or more people, typically a family or more, and be able to withstand at least a near-direct, or even direct, hit by a tornado. In the past, storm shelters may have been dug out of the ground and then reinforced with wood or other readily available materials. Modern storm shelters, however, are typically made out of concrete or other reinforced material that is formed into a generally box-like "bunker" structure under the ground with a door, hatch or other entry way at the surface of the ground that leads to stairs which allow people to rapidly move into the interior of the shelter when they feel threatened by a storm. Some people utilize prefabricated storm shelters that are positioned into a hole dug into the ground. The prefabricated storm shelters may be made out of a wide variety of materials, including steel and fiberglass, and may be other structures, such as septic tanks and the like, which have been modified to have a door and vents. Unlike bomb shelters of the Cold War days, most underground storm shelters are not buried as far underground and are neither configured nor stocked for long term occupancy. Because most storm systems, specially those that produce a tornado, pass through an area relatively fast, the fact that the storm shelter lacks much in the way of comfort, facilities, food, liquid and other supplies is generally not a problem for the occupants thereof.

Most home-based storm shelters are generally positioned below the ground relatively near the home so the people who will use the shelter can quickly get to the shelter when the storm is in their area. Although such storm shelters are preferably built sufficiently far away from the structure that material from the home which is displaced by the tornado will be less likely to fall on top of and cover the entryway into the storm shelter, thereby preventing people inside from exiting the underground storm shelter after the tornado has passed, such spacing is generally not possible or practical in the neighborhoods where most homes are located. In fact, due to the spacing of homes in most neighborhoods and the general nature of tornados, material from one or more neighbor homes is just as likely to fall on top of the storm shelter entryway as is material from the home directly associated with the storm shelter.

As can be readily appreciated by people who live in tornado-prone areas, the piling of debris on top of the entryway into the storm shelter presents a substantial problem to the occupants of the storm shelter, particularly in light of the relatively sparse interior of these shelters. Although rescue personnel are likely to be searching in an area devastated by a tornado or like event, they may not notice that particular piles of debris are covering up an entryway into a storm shelter in which one or more people are located. In addition, although storm shelters are often registered with the local or state authorities to assist with identifying where a storm shelter may be located after a tornado has passed, many are not. Even if a storm shelter is properly registered, accumulated debris and damage caused by the tornado is often such that it is very difficult for rescue personnel to use normal landmarks, including street signs, home addresses, points of interest and the like, to locate where the storm shelter is located. To compound the problem of locating people trapped in a storm shelter after a tornado, the normally available forms of communication, including telephones, cell phones, the Internet and the like, are usually unavailable to those people who are trapped in a storm shelter after a tornado has passed due to the lack of signal while located underground, lack of a hard or wireless connection to communication portals or damage to the surface facilities, including power lines and communication towers, necessary for such communications. As will be readily appreciated by people who face the potential of being trapped in an underground storm shelter for an extended amount of time, the time spent trapped in the storm shelter can be quite terrifying and, if it goes on long enough, may result in injuries or death to one or more of the occupants of the underground storm shelter.

What is needed, therefore, is an improved apparatus and system that allows a person trapped in an underground storm shelter to easily and quickly notify rescue personnel, whether official or not (i.e., civilians or other people who may be able to provide assistance) that he or she is in the underground storm shelter and is in need of assistance in order to get out of the storm shelter. The improved apparatus and system should be configured to clearly and distinctly notify the rescue personnel that one or more people are trapped in an underground storm shelter. The apparatus and system should be configured so as to not require any electrical or other power or a substantial amount of equipment to operate, both of which may not be available after a tornado. Preferably, the apparatus and system should be relatively easy to set-up and operate by a person trapped inside the storm shelter. It is also preferred that the apparatus and system be relatively inexpensive to manufacture so people will be inclined to purchase the apparatus and utilize the system in their underground storm shelter.

SUMMARY OF THE INVENTION

The emergency rescue notification apparatus and system for storm shelters of the present invention provides the benefits and solves the problems identified above. That is to say, the present invention discloses an improved apparatus and system which is specifically configured to allow the user thereof to effectively and efficiently notify rescue personnel that he or she, and perhaps one or more other people, is trapped in an underground storm shelter and needs assistance in order to get out of the storm shelter. The improved apparatus and system of the present invention is configured to allow the user thereof to quickly, clearly and distinctly notify rescue personnel that one or more people are trapped in an underground storm shelter. In the preferred configuration, the apparatus and system of the present invention do not require any electrical or other power or a substantial amount of equipment in order for the user to operate and activate the signal that lets the rescue personnel know he or she is trapped in an underground storm shelter. Specifically, in the preferred configuration the apparatus and system of the present invention is easy to set-up and manually operate by a person who is trapped inside an underground storm shelter. Because the preferred configuration of the apparatus and system of the present invention is relatively inexpensive to manufacture, people will be inclined to purchase the apparatus and utilize the system in their underground storm shelter.

In one embodiment of the present invention, the emergency rescue notification apparatus for use in an underground storm shelter generally comprises a base, an elongated tubular member having a lower end and an upper end, a cap at the upper end of the tubular member, a signaling mechanism supported by at least one of the tubular member and the cap at or generally toward the upper end of the tubular member for signaling that a user of the apparatus is trapped inside the storm shelter and in need of assistance to get out of the storm shelter and a moving mechanism configured to move the tubular member, and therefore the cap and signaling mechanism, upward so as to move the apparatus from its lowered position to its raised position. The signaling mechanism can comprise at least one of the following: (a) one or more light apertures in the tubular member generally near its upper end with a light source, which can be glow/light sticks, battery operated lights and the like, disposed inside the tubular member generally at or near the light apertures so as to outwardly emit light; (b) reflective material, such as strips of reflective tape, placed on the tubular member and/or the cap; (c) an audible source having one or more audio signal devices selected so as to emit sound from the apparatus; and (d) the cap and/or at least the portion of the tubular member that will extend above the storm shelter painted or coated with florescent material.

In one embodiment, the moving mechanism comprises an elongated threaded rod having a lower end and an upper end and a rotating mechanism having a nut member threadably received on the threaded rod. The lower end of the threaded rod is attached, preferably removably attached, to the base so as to vertically dispose the threaded rod, typically directly above the base. The tubular member is received over the threaded rod with the lower end of the tubular member being supported above the base by the nut member on the threaded rod. The rotating mechanism is configured to move the tubular member up the length of the threaded rod so as to selectively move the apparatus from its lowered position to its raised position. Typically, the rotating mechanism includes a handle fixedly attached to the nut member to assist the user with moving the nut member along the threaded rod. The base, threaded rod and tubular member are cooperatively sized and configured such that when the apparatus is positioned in the storm shelter below an opening that is provided in an upper wall of the storm shelter for the apparatus, the nut member of the rotating mechanism is rotated to move the tubular member upward along the threaded rod to place the apparatus in the raised position and extend the cap and a portion of the tubular member through the opening in the upper wall of the storm shelter to display the signaling means above the upper wall of the storm shelter so it can be seen by rescue personnel in the area. In a preferred embodiment, the base has an upwardly disposed threaded opening and the lower end of the threaded rod is sized and configured to be threadably received in the threaded opening. To prevent the threaded rod from rotating relative to the base in the threaded opening and to secure the threaded rod to the base, a pin is received through an aperture in the base and into an aperture in the threaded rod.

In another embodiment, the moving mechanism comprises a lifting mechanism that is structured and arranged to raise the tubular member and extend the cap and signaling mechanism through the opening in the upper wall of the storm shelter to signal the rescue personnel. The lifting mechanism can be a hydraulic jack that is manually operated by the user by a handle that is attached to the lifting mechanism. A sleeve is used to interconnect the lifting mechanism and the lower end of the tubular member to facilitate the piston of the lifting mechanism raising the tubular member upward, as well as the cap and signaling mechanism at or near the upper end of the tubular member, towards the opening in the ceiling and upper wall of the storm shelter. In one embodiment, the sleeve comprises a lower section, an upper section and a plate or plug therebetween, with the lower section being open for the piston to push against the plate and the upper section being internally threaded to threadably receive the externally threaded lower end of the tubular member. Other types of mechanically, electrically or pneumatically powered jacks or like lifting mechanisms can also be utilized.

In one of embodiment of the present invention, the emergency rescue notification system generally comprises a storm shelter having an upper wall above a ceiling, an opening disposed through the ceiling and the upper wall, a plug apparatus removably positioned in the opening to selectively open or close the opening, and one of the rescue notification apparatuses described above, typically with the base on the floor of the storm shelter and the apparatus positioned below the opening in the ceiling. For these embodiments, either the rotating mechanism is rotated to move the tubular member upward along the threaded rod or the lifting mechanism is operated to move the tubular member upward so as to place the apparatus in its raised position and extend the cap and a portion of the tubular member through the opening in the ceiling and the upper wall, with the plug apparatus removed therefrom, to display the signaling mechanism above the upper wall of the storm shelter. In one embodiment, the plug apparatus comprises an expandable plug that is sized and configured to fit into the opening in the ceiling and the upper wall, a ceiling plate that is sized and configured to completely cover the opening in the ceiling and an expanding device operatively connected to the expandable plug. The expandable plug is attached, typically fixedly attached, to the ceiling plate so as to position the ceiling plate against the ceiling when the expandable plug is disposed in the opening of the upper wall. The expanding device is structured and arranged to expand the expandable plug to close the opening in the upper wall when the apparatus is not needed (e.g., when no one is trapped in the storm shelter) or to contract the expandable plug to allow the person trapped in the storm shelter to remove the plug apparatus from the opening in the upper wall so he or she can notify any nearby rescue personnel that he or she is there and needs assistance to get out of the storm shelter.

Accordingly, the primary aspect of the present invention is to provide an emergency rescue notification apparatus and system for storm shelters that has the advantages discussed above and which overcomes the various disadvantages and limitations associated with prior art apparatuses and systems for notifying rescue personnel that people are trapped in an underground storm shelter.

It is an important aspect of the present invention to provide a new apparatus and system that allows the user thereof to notify rescue personnel that one or more people are trapped in an underground storm shelter and assistance is needed to get out of the storm shelter.

It is also an important aspect of the present invention to provide an apparatus and system that quickly, clearly and distinctly notifies rescue personnel that one or more people are trapped in an underground storm shelter and that they need assistance in order to get out of the storm shelter.

It is also an important aspect of the present invention to provide an apparatus that allows a person trapped in an underground storm shelter which has debris covering the entryway that prevents exit from the storm shelter to notify rescue personnel that one or more people are trapped in the underground storm shelter and need assistance to get out.

It is also an important aspect of the present invention to provide an apparatus and system for notifying rescue personnel that one or more people are trapped in an underground storm shelter that, in a preferred embodiment, does not require electrical or other power or a substantial amount of equipment for a person trapped in the storm shelter to operate.

It is also an important aspect of the present invention to provide an apparatus and system for notifying rescue personnel that one or more people are trapped in an underground storm shelter that is relatively easy to set-up and operate by a person in the storm shelter.

It is also an important aspect of the present invention to provide an apparatus and system for notifying rescue personnel that one or more people are trapped in an underground storm shelter that comprises a tubular member, a cap and signaling mechanism near the upper end of the tubular member and a moving mechanism that moves the cap and signaling mechanism above the debris that is covering the storm shelter, with the moving mechanism having either an elongated threaded rod and a cooperatively configured rotating mechanism that rotates a nut on the threaded rod to move the tubular member upward along the length of the threaded rod or a lifting mechanism that engages the bottom of the tubular member so as to raise the tubular member upward.

Another important aspect of the present invention is to provide an apparatus and system for notifying rescue personnel that people are trapped in an underground storm shelter which is relatively inexpensive to manufacture.

The above and other aspects of the present invention are explained in greater detail by reference to the attached figures and to the description of the preferred embodiments which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 7 is a side view of the elongated threaded rod of the emergency rescue notification apparatus of FIG. 3 shown being threadably received into the base apparatus thereof;

FIG. 8 is a side view of the rotating mechanism of FIG. 4 being lowered into position on the threaded rod of FIG. 7;

FIG. 9 is a side view of the cap member of the emergency rescue notification apparatus of FIG. 3 being rotatably attached to the second or upper end of the elongated tubular member thereof;

FIG. 10 is a side view of the tubular member of FIG. 9 being lowered over the threaded rod onto the rotating mechanism to place the emergency rescue notification apparatus in the lowered position of FIG. 1;

FIG. 11 is a side view of an emergency rescue notification apparatus that is configured according to an alternative embodiment of the present invention having jack mechanism to raise the tubular member with the apparatus shown in its lowered position; and FIG. 12 is an exploded side view of the apparatus of FIG. 11, with the tubular member and components thereof shown as a single item.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain shapes and configurations and describe certain materials for the components of the emergency rescue notification apparatus and system of the present invention, those skilled in the art will understand that this is merely for purposes of simplifying this disclosure and that the apparatus and system of the present invention are not so limited.

Figure 1:
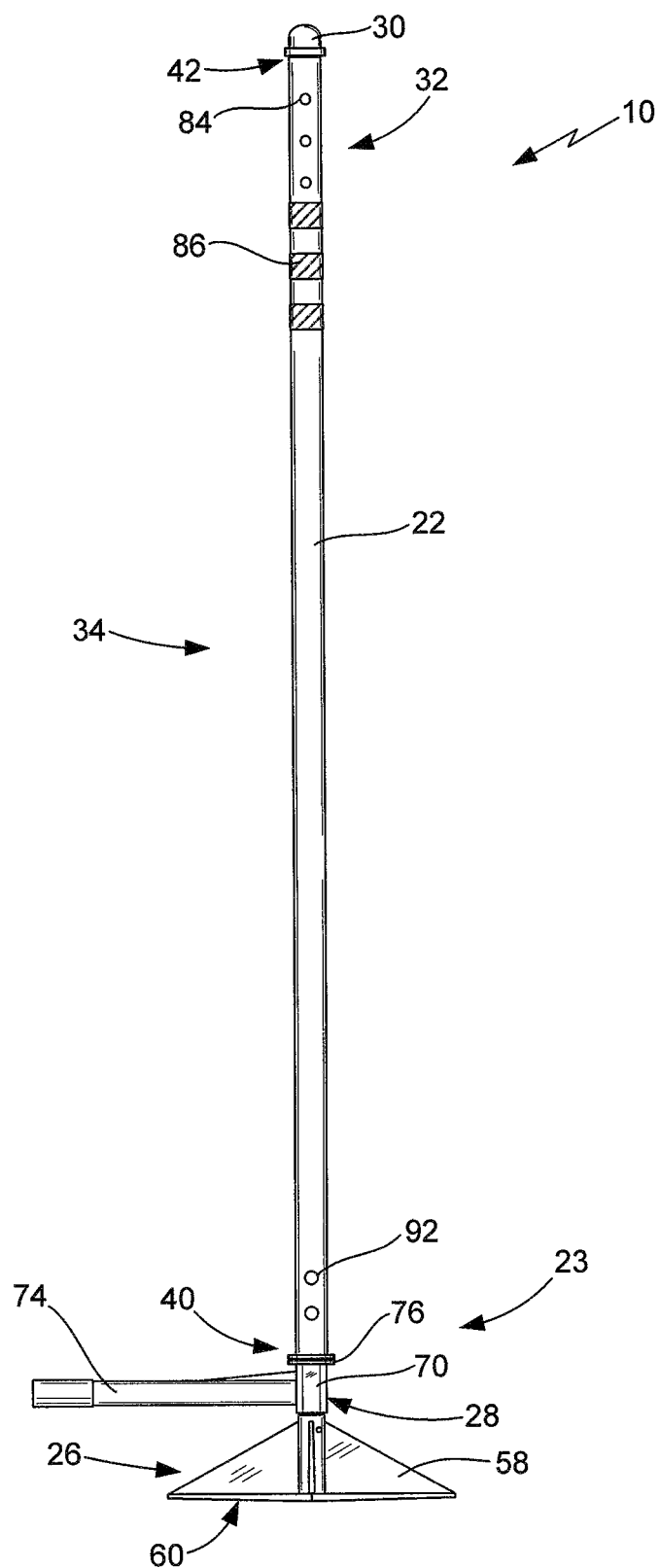
FIG. 1 is a side view of an emergency rescue notification apparatus that is configured according to a preferred embodiment of the present invention shown in its lowered position.
Figure 2:
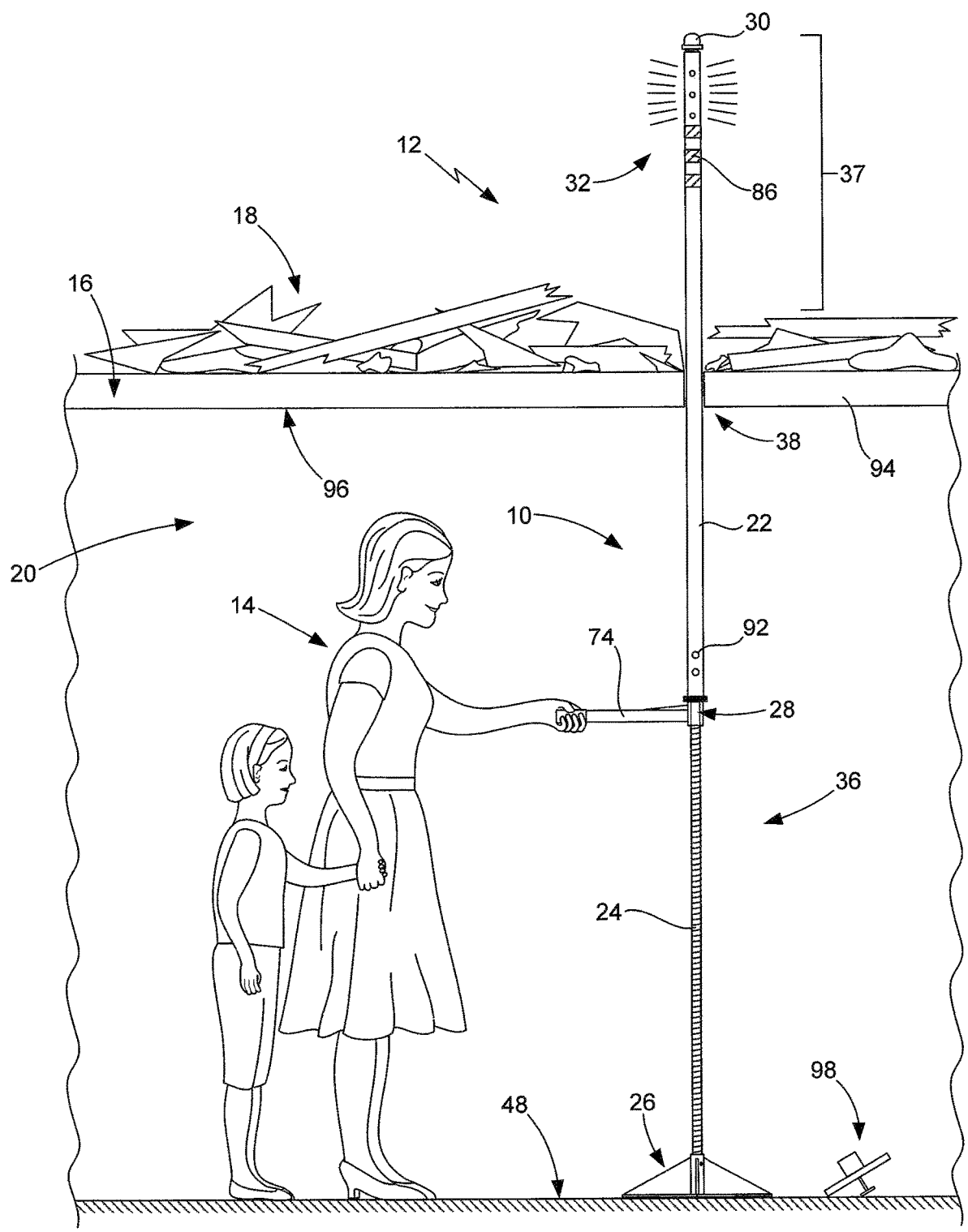
FIG. 2 is an illustration of an emergency rescue notification system that is configured according to a preferred embodiment of the present invention utilizing the emergency rescue notification apparatus of FIG. 1, with the apparatus shown in its raised position to notify rescue personnel that people are trapped in the storm shelter.

An emergency rescue notification apparatus that is configured pursuant to one of the preferred embodiments of the present invention is shown generally as 10 in FIGS. 1-3 and 10-11. An emergency rescue notification system that is configured according to a preferred embodiment of the present invention, which utilizes apparatus 10, is shown generally as 12 in FIG. 2. The emergency rescue notification apparatus 10 and system 12 are configured for use by a user 14 to notify rescue personnel that one or more people are trapped in an underground storm shelter 16 and need assistance to get out of the storm shelter 16, as shown in FIG. 2. As set forth in the Background, the user 14 and one or more people may be trapped inside the underground storm shelter 16 after a tornado has deposited debris 18 on top of the area where the storm shelter 16 is located in a manner such that the debris 18 blocks the normal exit, such as a door or hatch (not shown), from the storm shelter 16 so as to trap the user 14 and others in the interior space 20 of the storm shelter 16, as shown in FIG. 2. As also set forth in the Background, the typical storm shelter 16 does not contain much in the way of facilities, food, liquid and comfort. Naturally, persons trapped in the interior 20 of the storm shelter 16 will experience significant anxiety due to being trapped underground. In addition to any anxiety that may befall the trapped occupants in the storm shelter 16, if the user 14 and/or one or more of the other people in the storm shelter 16 are injured as a result of the storm or otherwise need medical attention or medication (e.g., perhaps due to a pre-existing condition such as asthma), then time may be of the essence to get medical help to the people trapped in the storm shelter 16.

Figure 3:
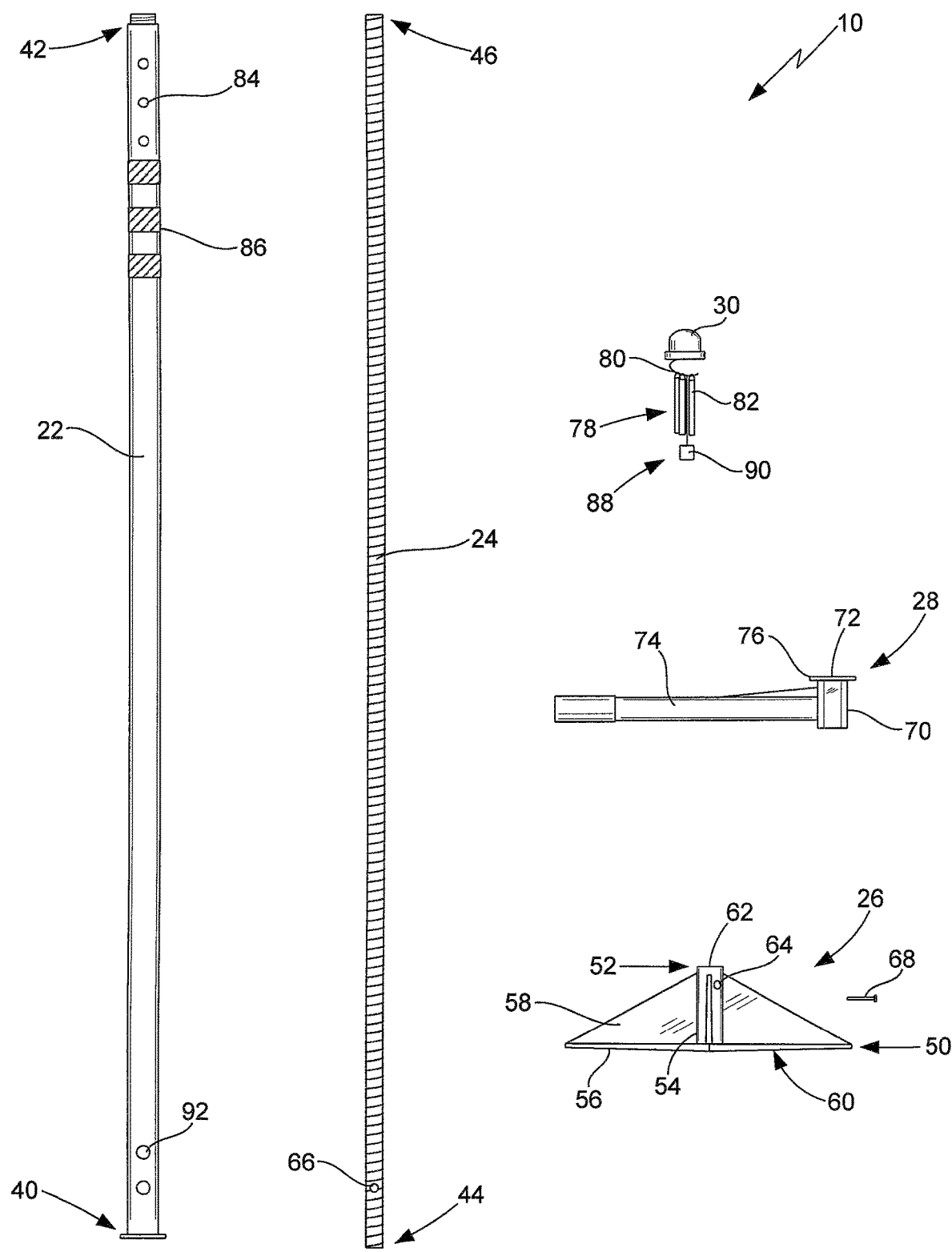
FIG. 3 is an exploded view of the emergency rescue notification apparatus of FIG. 1 to show the various components thereof.

The apparatus 10 of the present invention primarily comprises an elongated tubular member 22, a moving mechanism 23 for moving the tubular member 22 upward inside the storm shelter 16, a base 26 supporting the moving mechanism 23 and tubular member 22, a cap 30 on the tubular member 22 and a signaling mechanism 32 associated with the tubular member 22 disposed generally near the cap 30, as best shown in FIGS. 1-3. As set forth in more detail below, the moving mechanism 12 is structured and arranged to moveably support the tubular member 24 in order to move the apparatus 10 from its lowered position 34, shown in FIGS. 1 and 11, to its raised position 36, shown in FIG. 2, to raise the tubular member 22 and the cap 30 and signaling mechanism 32 at the end thereof. When in use to signal would be rescuers that the user 14 is trapped in the underground storm shelter 16, typically with one or more other people, the cap 30 and a portion 37 of the tubular member 22 are raised through an opening 38 in the storm shelter 16 above the debris 18. Due to the signaling mechanism 32, the rescue personnel will be able to see, whether during the day or at night, the user 14 is trapped in the storm shelter 16 and needs to be rescued. One benefit of the apparatus 10 and system 12 of the present invention is that the rescue personnel will be able to quickly focus some of their efforts on a specific location where people, including the user 14, are actually in need instead of randomly digging through the large area of debris 18 that typically exists as a result of a tornado. As set forth above, the rescue personnel will not have to just rely on finding street signs and other landmarks, both of which may have been damaged by the storm, or on perhaps incomplete information from a central office to find where the storm shelter 16 is located, as the signaling mechanism 32 will lead the rescue personnel directly to where the user 14 is trapped underground.

In the embodiment shown in FIGS. 1-10, the moving mechanism 23 comprises an elongated externally threaded rod 24 and a rotating mechanism 28 threadably engaged with the threaded rod 24. As set forth in more detail below, the threaded rod 24 is received into and fixedly positioned in base 26 to vertically dispose the threaded rod 24 relative to the base 26, the rotating mechanism 28 is threaded onto the threaded rod 24 until the rotating mechanism 28 is positioned at or near the base 26, the cap 30 is placed on one end of the tubular member 22, the tubular member 22 is placed over the threaded rod 24 in abutting relation to the rotating mechanism 28, thereby placing the apparatus 10 in lowered position 34, and then the rotating mechanism 28 is rotated up the threaded rod 24, thereby raising the tubular member 22, as well as the cap 30 and signaling mechanism 32, at the end of the tubular member 22, to place the apparatus 10 in its raised position 36, as best shown in FIGS. 1-2 and 7-10.

The tubular member 22 has a first or lower end 40 and a second or upper end 42. The cap 30 and the upper end 42 of the tubular member 22 are cooperatively configured for the cap 30 to attach to upper end 42. In a preferred embodiment, the upper end 42 is externally threaded and the inside of cap 30 is cooperatively threaded so the cap 30 can be threadably and removably attached to the upper end 42 of tubular member 22, as shown in FIG. 9. Although cap 30 may be fixedly attached to the upper end 42, the preferred configurations of signaling mechanism 32 generally benefit from having cap 30 removably attached to tubular member 22. As will be readily appreciated by those skilled in the art, the tubular member 22 should be made out of a sufficiently stiff and strong material, such as steel or the like, that it will be able to push the cap 30 through any debris 18 that may be located above the opening 38 in the storm shelter 16 so the cap 30 and signaling mechanism 32 may be more easily seen by the rescue personnel. In one embodiment, the tubular member 22 is a 1¼" steel pipe approximately five to six feet in length. In the embodiments shown in the figures, the tubular member 22 is shown as a single elongated tube. However, persons skilled in the art will readily appreciate that the tubular member 22 may be provided in two or more sections, for ease of transport and storage, that are joined together, typically threadably or connectedly joined, when the apparatus 10 and system 12 are needed to signal that the user 14 is trapped in the storm shelter 16. Alternatively, tubular member 22 can be telescopically configured for ease of transport and storage. Likewise, materials other than steel can be used as long as the materials are sufficiently stiff and strong to accomplish the objectives set forth herein.

In a preferred embodiment, the threaded rod 24 is externally threaded along all or nearly all of its length and is made out of steel or other sufficiently stiff and strong material. As best shown in FIG. 3, the threaded rod 24 has a first or lower end 44 and a second or upper end 46. As set forth in more detail below, the thread pattern chosen for threaded rod 24 should be cooperatively configured to allow the lower end 44 to threadably engage the base 26 so the threaded rod 24 may be held in an upright position extending above base 26 and to be threadably engaged along its length by the rotating mechanism 28 in a manner that allows the rotating mechanism 28 to be lowered onto the threaded rod 24 and then to raise the cap 30 and the portion 37 of the tubular member 22 through the opening 38 in the storm shelter 16, as shown in FIG. 2. As with the tubular member 22, it may be beneficial to provide threaded rod 24 in one or more connecting sections or to make threaded rod 24 telescoping for ease of transport or storage of the apparatus 10 when it is not in use.

Figure 5:
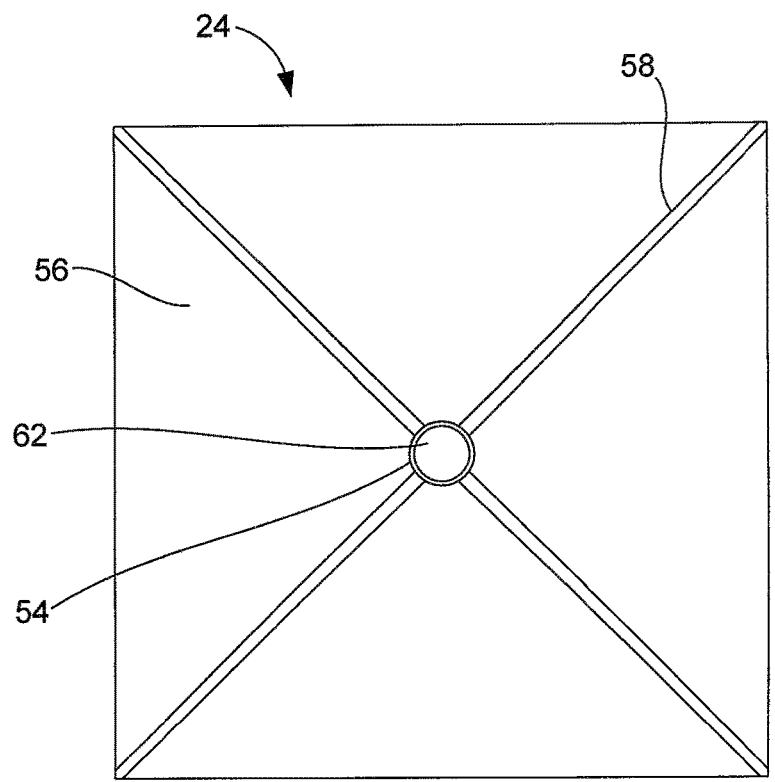
FIG. 5 is a top view of the base of the emergency rescue notification apparatus of FIG. 1.

The base 26 is structured and arranged to rest on the floor 48 of the storm shelter 16 and support the other components of the apparatus 10 as it is utilized to raise the cap 30 and the portion 73 of the tubular member 22 through the opening 38 in the storm shelter 16 and, as may be necessary, any debris 18 that is covering the opening 38, as shown in FIG. 2. The base 26 has a first or lower end 50 and a second or upper end 52, as best shown in FIG. 3. In the embodiment shown in FIGS. 1-3, 5 and 7-10, base 26 comprises a short section of tubular steel pipe 54 mounted in a vertical position onto a generally square steel plate 56 having one or more steel support members 58 fixedly joining the pipe 54 and the plate 56, as best shown in FIGS. 3 and 5. In the preferred embodiment, the lower surface 60 of the plate 56 is at least substantially planar so the base 26 will securely rest on the floor 48 of the storm shelter 16. The pipe 54 at the upper end 52 of base 26 is provided with an upwardly disposed opening 62 that is sized and configured to receive and support the lower end 44 of threaded rod 24, as shown in FIGS. 2 and 7-8. In a preferred embodiment, the lower end 44 of threaded rod 24 is merely inserted into the pipe 54 through the opening 62. In another embodiment, the pipe 54 is internally threaded at opening 62 such that the lower end 44 of threaded rod 24 is threadably received into the pipe 54. In yet another embodiment, the lower end 44 of the threaded rod 24 can be integral with the base 26, such as at pipe 54. Various other mechanisms to join the lower end 44 of the threaded rod 24 can also be utilized with the apparatus 10 of the present invention. To prevent threaded rod 24 from becoming unattached to the base 26 when using the rotating mechanism 28 to raise the tubular member 22, it is preferred to secure the lower end 44 of the threaded rod 24 to the base 26 so the threaded rod 24 will not rotate relative to the base 26. In one embodiment, best shown in FIG. 3, an aperture 64 is provided in the sidewall of pipe 54 and a corresponding aperture 66 is provided in the threaded rod 24, generally near the lower end 44 thereof, that are each sized and configured to receive a pin 68. When the pin 68 is received through the aperture 64 in pipe 54 and into or through the aperture 66 in threaded rod 24, the threaded rod 24 will not rotate relative to or be able to be pulled out of base 26, which will facilitate the use of rotating mechanism 28 to raise the tubular member 22 so as to dispose the cap 30 above the debris 18 blocking the user's self-extraction from storm shelter 16.

Figure 4:
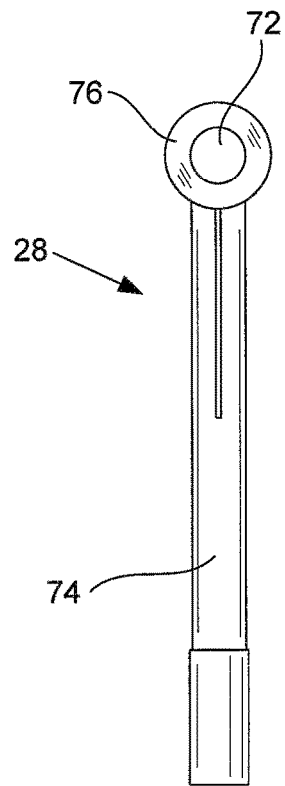
FIG. 4 is top view of the rotating mechanism shown in the embodiment of the emergency rescue notification apparatus of FIG. 1 and which is utilized in the system of FIG. 2 to place the apparatus in its raised position.

The rotating mechanism 28 is structured and arranged to be received onto the threaded rod 24 and to support and raise the tubular member 22 so as to extend the cap 30 and the portion 37 of tubular member 22 above any debris 18 that may be trapping the user 14 inside storm shelter 16. The rotating mechanism has a nut member 70 having an internally threaded aperture 72 therethrough, as best shown in FIGS. 3 and 4, that is sized and configured to be threadably received onto the threaded rod 24, as shown in FIG. 8, and then used to raise the tubular member 22 so as to push the cap 30, signaling mechanism 32 and the portion 37 of tubular member 22 above the ground, and any debris 18, located on the ground above the storm shelter 16. The rotating mechanism 28 has a device for rotating the nut member 70 up and down the threaded rod 24, as shown in FIGS. 2 and 8. Although the device for rotating nut member 70 may be separate from the nut member 70, such as a wrench or like tool, in a preferred configuration of the apparatus 10 of the present invention, the device for rotating nut member 70 on threaded rod 24 is a handle 74 that is fixedly attached, such as by welding or the like, to the nut member 70, as best shown in FIGS. 3 and 4. As best shown in FIGS. 1 and 2, during use of apparatus 10 the lower end 40 of tubular member 22 will be placed in abutting relation to the rotating mechanism 28 so that the rotating mechanism 28 will push the cap 30 and tubular member 22 up through the opening 38 in the storm shelter 16. To facilitate the abutting relation between the lower end 40 of tubular member 22 and the rotating mechanism 28 a support plate 76 may be placed at the lower end 40 of the tubular member 22 and/or at the upper end of the nut member 70 to provide, if needed or desired, more surface area to contact the lower end 40 of tubular member 22. Although use of a support plate 76 on both the tubular member 22 and rotating mechanism 28 is shown in the drawings, this may not be necessary. Naturally, the support plate 76 must have an aperture that is sized greater than the diameter of the threaded rod 24 and the diameter of the internally threaded aperture 72 through the nut member 70 so the support plate(s) will not interfere with the threaded connection between the threaded rod 24 and the nut member 70. The nut member 70 and handle 74 should be made out of steel or other stiff and strong material. If desired, a rubber hand grip or the like covering or coating may be utilized on handle 74 for the comfort of user 14 so as to facilitate placing rotating mechanism 28 on threaded rod 24 or using rotating mechanism 28 to raise the tubular member 22 and cap 30.

As set forth above, the cap 30 is attached to the upper end 42 of the tubular member 22 and is at least somewhat structured and arranged to facilitate being pushed through any debris 18 that may be above the opening 38 in the storm shelter 16, as shown in FIG. 2. In a preferred configuration, the cap 30 is made out of metal and is internally threaded to be threadably received onto the externally threaded second end 42 of tubular member 22, as shown in FIG. 9. In a preferred embodiment, the cap 30 is also utilized to assist with the configuration and use of the signaling mechanism 32. As best shown in FIG. 3, a light source 78 can be removably attached to the cap 30 by use of a wire, string or the like connecting member 80 that is configured to allow the light source 78 to securely hang below the cap 30 inside the tubular member 22 at or near the upper end 42 thereof. A wide variety of other connecting members 80 may also be utilized to connect the light source 78 to the cap 30 so as to be disposed inside the tubular member 22. In a preferred embodiment, the light source 78 comprises one or more glow/light sticks 82 that can produce a sufficient amount of light that will attract the attention of the rescue personnel at night. Although a wide variety of light sources 78 can be utilized with apparatus 10 and system 12, including battery-powered LED lights and the like, glow/light sticks 82 have the advantage that they can be stored for long periods of time, generally much longer than batteries, in an unused state and then activated, often by breaking or pulling apart the glow/light sticks 82, when they are needed to produce light (such as when the user 14 is trapped inside the storm shelter 16 after a tornado). In an alternative embodiment, the light source 78 can be fixedly attached to the cap 30 or it may comprise another component that is placed inside the tubular member 22 at or near the upper end 42 thereof before the cap 30 is attached thereto or the component having the light source 78 may be fixedly secured inside tubular member 22 at or near the upper end 42 thereof. In any such embodiment, it is preferred that the light source 78 be of the type that has enough power to produce light therefrom for a sufficient length of time (e.g., ten to twelve hours) to permit rescue personnel to see the light emanating therefrom to know that the user 14 needs to be rescued from the storm shelter 16. Of course, if the light source 78 does go out and more time is necessary for the user 14 to be noticed by the rescue personnel, the user 14 could lower the tubular member 22 back into the interior 20 of the storm shelter 16 by reverse rotating the rotating mechanism 28 so he or she can replace the light source 78 (or, as applicable, the power source for the light source 78) and then use the rotating mechanism 28 to re-raise the tubular member 22.

In a preferred embodiment of the apparatus 10 and system 12 of the present invention, signaling mechanism 32 includes the light source 78 that, as described above, hangs inside the interior of the tubular member 22 at or near the upper end 42 thereof. To allow the light from the light source 78 to be seen, the signaling mechanism 28 also comprises one or more, preferably a plurality, of light apertures 84 at or near the upper end 42 of the tubular member 22, as shown in FIGS. 1-3 and 9-10. In one embodiment, four columns of three light apertures 84 each are disposed around the sidewall of the tubular member 22 so that light will emanate therefrom in a generally 360° direction, as illustrated in FIG. 2. A wide variety of different numbers of light apertures 84 and patterns of the light apertures 84 will be suitable for use with the apparatus 10. As will be readily appreciated by persons skilled in the art, depending on the intensity of the light from the light source 78, the light emanating from the upper end 42 of the tubular member 22 will be able to be seen for a sufficient distance to attract any nearby rescue personnel. Preferably, the light source 78 is selected to emanate light for as long as may be practical based on the circumstances.

In a preferred embodiment of the apparatus 10 and system 12 of the present invention, the signaling means 38 also comprises reflective material 86 placed around the sidewall of the tubular member 22 at or near the upper end 42 thereof, as shown in FIGS. 1-3 and 9-10. The reflective material 86 may be placed on the cap 30 in addition to or instead of on the tubular member 22. Preferably, the reflective material 86 is of the type that is highly reflective of light such that any ambient light or light from rescue personnel will produce a bright reflection from the reflective material 86 to help the rescue personnel identify the location where the user 14 is trapped in storm shelter 16. In a preferred embodiment, the reflective material 86 comprises one or more strips of reflective tape (such as commonly utilized by the Department of Transportation) which are wrapped all the way around the tubular member 22, as shown in FIGS. 1-3 and 9-10.

The preferred embodiment of the signaling mechanism 32 utilized for apparatus 10 and system 12 also includes the tubular member 22 and the cap 30, which are the primary components of apparatus 10 that will be positioned above the ground and debris 18 during use of apparatus 10 and system 12, being made out of or coated with (i.e., painted or powder coated) material that facilitates visual recognition that the tubular member 22 and cap 30 comprise an emergency signal. For instance, in one embodiment at least the upper half of tubular member 22 is painted or coated with florescent yellow material and the cap 30 is painted or coated with florescent red material. Naturally, these colors can be reversed or both components can be painted or coated the same.

If desired, the signaling mechanism 32 can also include an audible source 88, such as a battery-powered audio signal device 90, that is included with or attached to the light source 78 so as to also hang below the cap 30, as shown in FIG. 3. Alternatively, although not likely preferred, the audible source 88 can be used exclusively in place of the light source 78. The audible source 88 should be selected so as to be able to emit a high pitch signal for an extended amount of time on as little power source as possible. The use of the audible source 88 is likely to facilitate identification of the location of the user 14 in storm shelter 16 during the daylight hours. A wide variety of different types of audio signal devices 90 are likely to be suitable for use as audible source 88. In an alternative embodiment, the audible source 88 can remain in the possession of user 14 inside the interior 20 of storm shelter 16 and he or she can activate the audible source 88, such as by pushing a button, lever or other mechanism on the audio signal device 90 when desired. As will be readily appreciated by those skilled in the art, when the user 14 activates the audio signal device 90 to create sound from an audible source 88 inside the storm shelter 16, the sound will travel up the tubular member 22 and out the light apertures 84 located at or near the upper end 42 of the tubular member 22. A wide variety of audio signal devices 90, including air horns, bells and the like (as well as human voices), can be used as the audible source 88. To facilitate the sound from the interior 20 of the storm shelter 16 being able to travel up the tubular member 22 to the light apertures 84, where it will exit therefrom, one or more sound apertures 92 can be provided towards the lower end 40 of the tubular member 22, as shown in FIGS. 1-3 and 9-10. The sound apertures 92 will also allow the user 14 and/or other people trapped inside the storm shelter 16 to verbally communicate with the rescue personnel.

Figure 6:
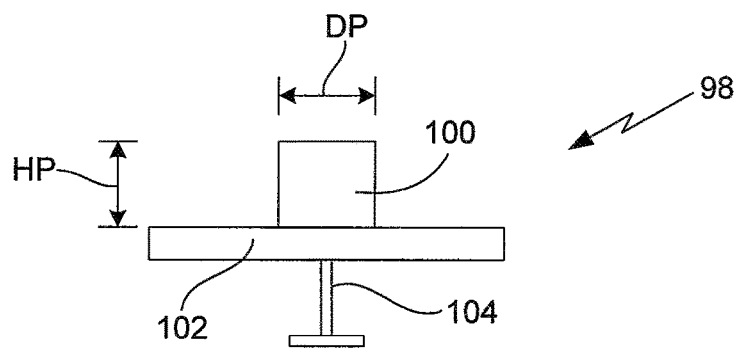
FIG. 6 is a side view of the plug mechanism that is utilized with the emergency rescue notification system of FIG. 2.

The system 12 of the present invention comprises apparatus 10, such as described above, and the storm shelter 16 that is structured and arranged for the use of apparatus 10. As generally well known, storm shelter 16 has at least an upper wall 94 that forms the downward facing ceiling 96 which, along with the floor 48 and the sidewalls (not numbered) define the interior 20 of the storm shelter 16. Although the upper wall 94 is typically made out of concrete, metal or other strong materials, in circumstances where the storm shelter 16 is merely dug out of the ground and no reinforcing material is utilized, the upper wall 94 may be the ground itself. In either configuration, the system 12 includes opening 38 through the upper wall 94 and ceiling 96. As will be readily appreciated by those skilled in the art, the opening 38 must be cooperatively sized with the tubular member 22 and cap 30 so these two components will fit through the opening 38 when it is necessary for the user 14 to utilize the apparatus 10 and system 12, as shown in FIG. 2. Naturally, because it may not be safe to have the opening 38 through the upper wall 94 and ceiling 96 open if a tornado were to hit or come close to the storm shelter 16, the preferred embodiment of system 12 also includes a plug apparatus 98, as shown in FIGS. 2 and 6. In addition, if opening 38 were left open it is likely that water from rain, sprinklers, irrigation or other sources of water or other fluid would flow into the interior 20 of the storm shelter 16, whether the storm shelter 16 was in use or not. The use of plug apparatus 98 prevents the problems associated with a hit or near hit from the tornado and prevents water flowing into the storm shelter 16. As such, the plug apparatus 98 should be structured and arranged to completely close the opening 38 when the opening 38 is not being used for apparatus 10.

In a preferred configuration, the plug apparatus 98 comprises an expandable plug 100 having a plug diameter DP and a plug height HP, as best shown in FIG. 6. The expandable plug 100 should be configured to move between a contracted position that has the plug diameter DP less than the diameter of the opening 38 so the expandable plug 98 can move in or out of the opening 38 when necessary and an expanded position that has the plug diameter DP expanding to entirely fill the opening 38 so as to close off the interior 20 of the storm shelter 16 from the outside. In a preferred configuration, which is shown in FIGS. 2 and 6, the expandable plug 100 is fixedly attached to a ceiling plate 102 that is sized and configured to be at least somewhat larger than the diameter of the opening 38 and to be sufficiently strong (such as a thick steel plate) so that the plug apparatus 98 cannot be pulled upward through the opening 38 by the force of a tornado or other force. The plug apparatus 98 of the present invention also includes an expanding device 104 that is operatively connected to the expandable plug 100 and structured and arranged to expand or contract the expandable plug 100 as desired by the user 14. The expanding device 104 may be a rotatable handle (as shown in FIGS. 2 and 6), lever, knob, switch, crank or other such device, the uses of which to expand/contract expandable plug 100 are known by persons skilled in the art with regard to such devices 104.

In use, the user 14 and, as applicable, one or more other people will evacuate to the storm shelter 16 when a tornado or other dangerous storm activity is approaching their location. Once they are closed in the storm shelter 16 they wait for the tornado or other storm activity to pass. If the user 14 is ready to exit the storm shelter 16 but cannot due to debris 18 blocking the door, hatch or other exit location, then he or she will be unable to self-extricate from the storm shelter 16. Instead of just waiting and hoping he or she is found soon, the user 14 can utilize the apparatus 10 and system 12 of the present invention to take steps to let rescue personnel know that he or she is trapped underground in the storm shelter 16 and needs assistance to get out. The user will operate the expanding device 104 of the plug apparatus 98 to contract the expandable plug 100 and then he or she will carefully lower the ceiling plate 102 and other plug components from the ceiling 96 to remove the expandable plug 100 from the opening 38 and open the storm shelter 16 to the outside.

The user 14 then places the lower surface 60 of the plate 56 of the base 26 on the floor 48 of the storm shelter 16 such that the pipe 54 component thereof is positioned below the opening 38, as generally shown in FIG. 2. The user 14 places the lower end 44 of the threaded rod 24 into the threaded opening 62 and rotates the threaded rod 24 to threadably engage it with the threaded opening 62, as shown in FIG. 7. The user 14 then places the threaded aperture 72 in the nut member 70 of the rotating mechanism 28 at the upper end 46 of threaded rod 24 and uses the handle 74 to threadably engage the threaded rod 24 and move the rotating mechanism to or near where the lower end 44 of the threaded rod 24 is engaged with the base 26, as shown in FIG. 8. Either before or after engaging the threaded rod 24 with the base 26 and/or placing the rotating mechanism 28 onto the threaded rod 24, the user 14 activates the light source 78 (as applicable) and places the light source 78 and, if also utilized, the audible source 88 into position below the cap 30 by connecting these components to the cap 30 (e.g., by use of a hook, tie, clasp, Velcro®, snaps or other connectors), lowering the light source 78 and/or audible source 88 into the upper end 42 of the tubular member 22 and then threadably engaging the internally threaded cap 30 with the external threads at the upper end 42 of tubular member 22 to secure the cap 30 to the tubular member 22 with the light source 78 and/or audible source 88 disposed inside the tubular member 22 at or about the light apertures 84 located at or near the second end 42 of the tubular member 22, as shown in FIG. 9. The user then places the lower end 40 of the tubular member 22 over the upper end 46 of the threaded rod 24, tilting the apparatus 10 as necessary, and lowers the tubular member 22 down over the threaded rod, as shown in FIG. 10, until the lower end 40 of tubular member 22 is in abutting relation with the rotating mechanism 28, thereby placing the apparatus 10 in its lowered position 34, as shown in FIG. 1.

After ensuring that the tubular member 22 and cap 30 of the apparatus 10 are aligned with the opening 38, the user 14 grasps the handle 74 and rotates the rotating mechanism 28 around the threaded rod 24, causing the nut member 70 to move up the threaded rod 24 and push the tubular member 22 upward. As shown in FIG. 2, this rotating action will move the cap 30 and the upper portion 37 of the tubular member 22 through the opening and past any debris 18 that may be located above the storm shelter 16 at or around the opening 38. Rescue personnel in the area will notice the light from the light source 78, emanating out of the light apertures 84. In addition to the light, the reflective material 86 will reflect light, the audible source 86 will emanate sound and the fluorescent colors of the cap 30 and tubular member 22 will attract the rescue personnel to the apparatus 10. All of these components will notify the rescue personnel that the user 14, as well as any other people, are trapped in the underground storm shelter 16 and need assistance to get out. After the user 14 and any other occupants of the storm shelter 16 are rescued the apparatus 10 is lowered into the interior 20 of the storm shelter 16 by reversing the operation of the rotating mechanism and the light source 78 and, as applicable, the audible source 88 is turned off so that other rescue personnel will not expend unnecessary effort to check out the now emptied storm shelter 16. The expandable plug 100 of plug apparatus 98 is placed back into the opening 38, with the ceiling plate 102 positioned against the ceiling 96, and expanding device 104 is operated to expand the expandable plug 100 and securely close the opening 38 so water, dirt and other material do not get inside the storm shelter 16. If desired, the apparatus is then disassembled and stored inside the storm shelter 16. The user 14 should replace, as necessary, any consumable supplies, such as the glow/light sticks 82 and/or batteries, to ensure that the apparatus 10 and system 12 are ready for re-use for the next storm.

A number of variations are possible for the apparatus 10 and system 12 of the present invention shown in FIGS. 1-10. For instance, the base 26 can be the floor 48 of the storm shelter 16 and the threaded rod 24 can be fixedly secured to the floor 46 by mounting the threaded rod 24 in the floor 46 (i.e., such that the threaded rod 24 is always there) or removably secured to the floor 46 providing a threaded opening 62 or other opening in floor 46. With regard to the embodiment of the present invention shown in FIGS. 1-10, tests done by the inventor has found that somewhat substantial weight, representing debris 18, can be moved by even a very small sized and/or young person by utilizing the handle 74 to push the tubular member 22 and cap 30 upward.

In another variation, the rotating mechanism 28 can utilize an electro-mechanical or hydraulic device to rotate the nut member 70 on the threaded rod 24, instead of handle 74, to move the rotating mechanism 28 up and down the threaded rod 24. This may be easier for some users, particularly with regard to raising the tubular member 22 through any debris 18 above the storm shelter 16. Depending on the mechanism selected, there may be issues with regard to having the necessary power to operate any such device, therefore a manually operated mechanism is generally preferred. An example of such an alternative embodiment of the present invention is shown in FIGS. 11 and 12. In this embodiment, moving mechanism 23 comprises lifting mechanism 106, such as the hydraulic jack shown in FIGS. 11 and 12, that is structured and arranged to move the tubular member 22 upward through the opening 38 in storm shelter 16 so as to move the apparatus 10 of the present invention from its lowered position 34 to its raised position 36. The lifting mechanism 106 is also structured and arranged to be placed on the floor 48 of the storm shelter 16 and be supported thereby as it raises the tubular member 22, and the cap 30 and signaling mechanism 32 at or near the upper end 42 thereof, through the opening 38 in the ceiling 96 and upper wall 94 of the storm shelter 16 to signal the rescue personnel that the user 14, and perhaps others, are trapped in the interior 20 of the storm shelter 16. As will be readily appreciated by those skilled in the art, a variety of different types of lifting mechanisms 106 can be utilized with the apparatus 10 and system 12 of the present invention.

As shown in FIGS. 11 and 12, in one embodiment lifting mechanism 106 is a hydraulic jack that is manually operated with handle 74 to raise the tubular member 22. The configuration and operation of such lifting mechanisms 106 are well known in the relevant art. Preferably, a base 26 is attached to or integral with the lower end 108 of the lifting mechanism 106 so as to allow the floor 48 to better support the lifting mechanism 106 during use of the apparatus 10. Alternatively, the base 26 can be the bottom of the lifting mechanism 106 itself, if properly sized and configured for stability, or base 26 can be the floor 48, such that the lifting mechanism 106 is mounted to the floor 48. As will be readily understood for hydraulic jack lifting mechanisms 106, the handle 74 is attached to the lifting mechanism 106 and operated to raise the piston 110 upward above the upper end 112 of the lifting mechanism 106 to perform the desired lifting operation. In the present invention, the upward movement of the piston 110 is utilized to raise the cap 30 at the upper end 42 of the tubular member 22 through the opening 38.

In one embodiment, the lower end 40 of the tubular member 22 is cooperatively sized and configured to attach directly to the piston 110 so the piston 110 pushes the tubular member 22 upward. In a preferred embodiment, a sleeve 114 interconnects the piston 110 of the lifting mechanism 106, as shown in FIGS. 11 and 12, to avoid the need to have a specially sized tubular member 22 and/or piston 110. In the embodiment shown, the sleeve 114 comprises a lower section 116 that is received over the piston 110, an upper section 118 that attaches to or receives the lower end 40 of tubular member 22 and a plug or plate 120 between the two sections 116/118 against which the top of the piston 110 pushes to raise the tubular member 22 upward. The bottom of the lower section 116 of the sleeve 114 is open to receive the piston 110. If desired, the internal area of lower section 116 can be shaped and configured, such as with an internal tube or the like, so that it better "matches" the shape and size of the piston 110. The upper section 118 is also open to receive the lower end 40 of the tubular member 22. In a preferred configuration, upper section 118 is internally threaded and configured to threadably receive the externally threaded lower end 40 of the tubular member 22, as shown in FIG. 12. Alternatively, the upper section 118 can be sized and configured to just receive (not threadably) and support the lower end 40 of the tubular member 22. Various other configurations can be used for sleeve 114 to interconnect the lifting mechanism 106 and the lower end 40 of the tubular member 22.

For use of the apparatus 10 in storm shelter 16, the base 26, lifting mechanism 106, sleeve 114 (if used) and tubular member 22 will be cooperatively sized and configured so that when the apparatus 10 is in the lowered position 34 the cap 30 will be below the ceiling 96 and when moved to the raised position 36, by lifting mechanism 106, the cap 30 will be above the upper wall 94 of the storm shelter 16 to provide the desired notification to the rescue personnel. For example, the lifting mechanism 106 can be three feet tall with a piston 110 having a three foot stroke and the tubular member 22 can be five to seven feet long to allow the apparatus 10 to be set up in a normal ceiling height (eight to nine feet) storm shelter 16 in its lowered position 34 and extend above the upper wall 94 of the storm shelter 16 when placed in its raised position 36. In use with the embodiment having lifting mechanism 106, the user 14 will place the lifting mechanism 106 below the opening 38 in the upper wall 94 and ceiling 96 of the storm shelter 16, if it is not already mounted to or integral with the floor 48 or otherwise already in position. If utilized, the lower section 116 of sleeve 114 is placed over the top of the piston 110 and then, in the embodiment shown in FIGS. 11 and 12, the lower end 40 of the tubular member 22 is threaded into the upper section 118. The user 14 then operates the lifting mechanism 106, after removing the plug apparatus 98 from the opening 38, to raise the cap 30 and, generally, a portion 37 of tubular member 22 upward through the opening 38 so the signaling mechanism 32 can be seen by the rescue personnel. In the embodiment shown in FIGS. 11 and 12, handle 74 is operatively connected, either always or selectively by the user 14, to the hydraulic jack lifting mechanism 106 and the user 14 moves the handle 74 to cause the piston 10 to move upward to raise the tubular member 22 upward. As can be readily appreciated by persons skilled in the art, other lifting mechanisms 106 will be operated differently to raise the tubular member 22. For instance, some lifting mechanisms 106 for use with the apparatus 10 and system 12 of the present invention may be mechanically (i.e., scissor jacks, etc.), electrically, hydraulically or even pneumatically jacking devices that are operated to raise the cap 30 and the portion 37 of tubular member 22 above the upper wall 94 of storm shelter 16.

In other, generally more advanced and more expensive embodiment, the apparatus 10 and system 12 of the present invention can include wired and/or wireless communication capability to allow the user 14 and other people trapped in the storm shelter 16 to communicate directly with the rescue personnel located above the storm shelter 16. As with the powered devices to operate the moving mechanism 23, whether the rotating mechanism 28 or lifting mechanism 106, this type of communication capability may be limited by the ability to have or provide the necessary power to operate the devices. However, devices that utilize low amounts of power or having a power source available may make these options worthy of consideration.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. An emergency rescue notification apparatus for use in a storm shelter having a floor disposed below an opening in an upper wall thereof, said apparatus comprising:
    an elongated tubular member having a lower end and an upper end;
    a cap at said upper end of said tubular member, said cap sized and configured to fit through the opening in the upper wall of the storm shelter;
    signaling means supported by at least one of said tubular member and said cap at or generally toward said upper end of said tubular member for signaling that a user of said apparatus is trapped inside the storm shelter and in need of assistance to get out of the storm shelter; and
    moving means associated with said tubular member for moving said tubular member upward relative to the floor of the storm shelter so as to selectively move said apparatus from a lowered position with said cap below the upper wall of the storm shelter to a raised position with said cap extended through the opening in the upper wall of the storm shelter so as to display said signaling means above the upper wall of the storm shelter, said tubular member and said moving means being cooperatively sized and configured such that when said apparatus is positioned in the storm shelter below the opening in the upper wall thereof and said moving means is operated to move said tubular member upward to place said apparatus in said raised position said signaling means will be positioned above the upper wall of the storm shelter.

2. The apparatus of claim 1, wherein said moving means comprises an elongated threaded rod that is sized and configured to be supported by a base on or integral with the floor of the storm shelter so as to vertically dispose said threaded rod above said base and a rotating mechanism operatively engaged with said threaded rod to move said tubular member upward along a length of said threaded rod, said tubular member sized and configured to be received over said threaded rod, said rotating mechanism structured and arranged to moveably support said tubular member above said base.

3. The apparatus of claim 2, wherein said rotating mechanism comprises a nut member threadably received on said threaded rod, said nut member sized and configured to support said lower end of said tubular member so as to move said tubular member upward along the length of said threaded rod when said rotating mechanism is operated to rotate said nut member relative to said threaded rod.

4. The apparatus of claim 3, wherein said rotating mechanism further comprises a handle attached to or integral with said nut member, said handle configured to allow the user to rotate said nut member on said threaded rod.

5. The apparatus of claim 2, wherein said base has an upwardly disposed opening and a lower end of said threaded rod is sized and configured to be received in a pipe of said base through said opening, said apparatus further comprising a pin sized and configured to be received through an aperture in said base and into an aperture in said threaded rod to secure said threaded rod to said base and prevent rotation of said threaded rod relative to said base.

6. The apparatus of claim 1, wherein said moving means comprises a lifting mechanism structured and arranged to be supported by the floor of the storm shelter below the opening in the upper wall thereof and to be operated to move said tubular member upward relative to the floor to place said apparatus in said raised position.

7. The apparatus of claim 6, wherein said moving means further comprises a sleeve sized and configured to interconnect said lifting mechanism and said tubular member.

8. The apparatus of claim 6, wherein said lifting mechanism is a hydraulic jack.

9. The apparatus of claim 1, wherein said signaling means comprises one or more light apertures in said tubular member generally near said upper end of said tubular member and a light source disposed inside said tubular member generally at or near said one or more light apertures, said light source selected so as to emit light through said light apertures when said apparatus is utilized to signal that the user is trapped in the storm shelter.

10. The apparatus of claim 9, wherein said signaling means further comprises an audible source having one or more audio signal devices selected so as to emit sound through said one or more light apertures.

11. The apparatus of claim 1, wherein said signaling means further comprises at least one of reflective material placed on said tubular member generally toward said upper end thereof, an audible source having one or more audio signal devices selected so as to emit sound through said one or more light apertures and said cap and said portion of said tubular member being painted or coated with florescent material.

12. An emergency rescue notification apparatus for use in a storm shelter having a floor disposed below an opening in an upper wall thereof, said apparatus comprising:
  a base defining an upwardly disposed opening;
  an elongated tubular member having a lower end, an upper end and one or more light apertures generally near said upper end of said tubular member, at least a portion of said upper end of said tubular member sized and configured to fit through the opening in the upper wall of the storm shelter;
  a cap at said upper end of said tubular member, said cap sized and configured to fit through the opening in the upper wall of the storm shelter;
  signaling means supported by at least one of said tubular member and said cap at or generally toward said upper end of said tubular member for signaling that a user of said apparatus is trapped inside the storm shelter and in need of assistance to get out of the storm shelter, said signaling means comprising a light source disposed inside said tubular member; and
  moving means associated with said tubular member for moving said tubular member upward relative to the floor of the storm shelter so as to selectively move said apparatus from a lowered position with said cap below the upper wall of the storm shelter to a raised position with said cap extended through the opening in the upper wall of the storm shelter so as to display said signaling means above the upper wall of the storm shelter, said tubular member and said moving means being cooperatively sized and configured such that when said apparatus is positioned in the storm shelter below the opening in the upper wall thereof and said moving means is operated to move said tubular member upward to place said apparatus in said raised position said signaling means will be positioned above the upper wall of the storm shelter.

13. The apparatus of claim 12, wherein said moving means comprises an elongated threaded rod and a rotating mechanism, said threaded rod having a lower end received in said upwardly disposed opening of said base so as to vertically dispose an upper end of said threaded rod above said base, said tubular member sized and configured to be received over said threaded rod, said rotating mechanism structured and arranged to moveably support said tubular member over said threaded rod and operatively engage said threaded rod so as to move said tubular member upward along a length of said threaded rod.

14. The apparatus of claim 13, wherein said rotating mechanism comprises a nut member threadably received on said threaded rod and a handle attached to or integral with said nut member, said handle configured to allow the user to rotate said nut member on said threaded rod, said nut member sized and configured to support said lower end of said tubular member so as to move said tubular member upward along the length of said threaded rod when said rotating mechanism is operated to rotate said nut member relative to said threaded rod.

15. The apparatus of claim 12, wherein said moving means comprises a lifting mechanism structured and arranged to be supported by the floor of the storm shelter below the opening in the upper wall thereof and to be operated to move said tubular member upward relative to the floor to place said apparatus in said raised position.

16. The apparatus of claim 12, wherein said signaling means further comprises at least one of reflective material placed on said tubular member generally toward said upper end thereof, an audible source having one or more audio signal devices selected so as to emit sound through said one or more light apertures and said cap and said portion of said tubular member being painted or coated with florescent material.

17. An emergency rescue notification system, comprising:
  a storm shelter having an upper wall above a ceiling and a floor below said ceiling;
  an opening disposed through said ceiling and said upper wall of said storm shelter;
  a plug apparatus removably positioned in said opening to selectively open or close said opening; and
  a rescue notification apparatus positioned in said storm shelter below said opening, said apparatus comprising a base, an elongated tubular member having a lower end and an upper end, a cap at said upper end of said tubular member, signaling means supported by at least one of said tubular member and said cap at or generally toward said upper end of said tubular member for signaling that a user of said apparatus is trapped inside said storm shelter and in need of assistance to get out of said storm shelter and moving means associated with said tubular member for moving said tubular member upward relative to said floor of the storm shelter so as to selectively move said apparatus from a lowered position with said cap below said upper wall of said storm shelter to a raised position with said cap extended through said opening in said upper wall of said storm shelter so as to display said signaling means above said storm shelter, said base, said tubular member and said moving means being cooperatively sized and configured such that when said apparatus is positioned in said storm shelter below said opening in said upper wall thereof and said moving means is operated to move said tubular member upward to place said apparatus in said raised position said signaling means will be positioned above said upper wall of said storm shelter.

18. The system of claim 17, wherein said moving means comprises an elongated threaded rod and a rotating mechanism, said threaded rod having a lower end received in an upwardly disposed opening of said base so as to vertically dispose an upper end of said threaded rod above said base, said tubular member sized and configured to be received over said threaded rod, said rotating mechanism structured and arranged to moveably support said tubular member over said threaded rod and operatively engage said threaded rod so as to move said tubular member upward along the length of said threaded rod.

19. The system of claim 18, wherein said rotating mechanism comprises a nut member threadably received on said threaded rod and a handle attached to or integral with said nut member, said handle configured to allow the user to rotate said nut member on said threaded rod, said nut member sized and configured to support said lower end of said tubular member so as to move said tubular member upward along the length of said threaded rod when said rotating mechanism is operated to rotate said nut member relative to said threaded rod.

20. The system of claim 17, wherein said moving means comprises a lifting mechanism structured and arranged to be supported by the floor of the storm shelter below the opening in the upper wall thereof and to be operated to move said tubular member upward relative to the floor to place said apparatus in said raised position.

21. The apparatus of claim 17, wherein said signaling means comprises at least one of (a) one or more light apertures in said tubular member generally near said upper end of said tubular member with a light source disposed inside said tubular member generally at or near said one or more light apertures so as to emit light through said light apertures, (b) reflective material placed on at least one of said tubular member and said cap, (c) an audible source having one or more audio signal devices selected so as to emit sound, and (d) at least one of said cap and said portion of said tubular member painted or coated with florescent material.

22. The apparatus of claim 21, wherein said plug apparatus comprises an expandable plug sized and configured to fit into said opening in said ceiling and said upper wall, a ceiling plate sized and configured to completely cover said opening in said ceiling, and an expanding device operatively connected to said expandable plug, said expandable plug attached to said ceiling plate so as to position said ceiling plate against said ceiling when said expandable plug is disposed in said opening of said upper wall, said expanding device structured and arranged to expand said expandable plug to close said opening in said upper wall or contract said expandable plug so as to allow said plug apparatus to be removed from said opening in said upper wall.

* * * * *